United States Patent [19]

Hwang et al.

[11] Patent Number: 5,798,635
[45] Date of Patent: Aug. 25, 1998

[54] ONE PIN ERROR AMPLIFIER AND SWITCHED SOFT-START FOR AN EIGHT PIN PFC-PWM COMBINATION INTEGRATED CIRCUIT CONVERTER CONTROLLER

[75] Inventors: Jeffrey H. Hwang, Saratoga; Donald Yu, San Jose; Calvin Hsu, San Mateo; Alland Chee, Union City, all of Calif.

[73] Assignee: Micro Linear Corporation, San Jose, Calif.

[21] Appl. No.: 796,128

[22] Filed: Feb. 6, 1997

Related U.S. Application Data

[63] Continuation-in-part of Ser. No. 670,181, Jun. 20, 1996.
[51] Int. Cl.$^6$ .................. G05F 1/613; G05F 1/70
[52] U.S. Cl. .................. 323/222; 323/207; 363/89
[58] Field of Search .................. 323/222, 223, 323/226, 273, 274, 282, 284, 207; 363/20, 21, 37, 79, 89, 97, 101, 124, 131

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |
| 3,883,756 | 5/1975 | Dragon | 307/265 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,672,303 | 6/1987 | Newton | 323/285 |
| 4,672,518 | 6/1987 | Murdock | 363/21 |

(List continued on next page.)

FOREIGN PATENT DOCUMENTS 60-22490  2/1985  Japan ........................... 5/41

OTHER PUBLICATIONS

"Nonlinear–Carrier Control for High Power Factor Rectifiers Based On Flyback, Cuk, or Sepic Converters," R. Zane and D. Maksimovic, Applied Power Electronics Conf., pp. 814–820, 1996.

"Nonlinear–Carrier Control for High Power Factor Boost Rectifiers," D. Maksimovic, Y. Jang, R. Erikson, Applied Power Electronics Conf., pp. 635–641, 1995.

(List continued on next page.)

*Primary Examiner*—Adolf Berhane
*Attorney, Agent, or Firm*—Haverstock & Owens LLP

[57] ABSTRACT

A combination PFC-PWM integrated circuit converter controller having a power factor correction stage and a pulse-width modulation stage. The power factor correction stage provides unity power factor and a regulated intermediate output voltage by sensing a current in the power factor correction circuit and by sensing the regulated intermediate output voltage in a voltage control loop. The regulated intermediate output voltage is sensed by an error amplifier that includes a current mirror. A dc supply voltage for powering the integrated circuit is generated that is representative of the regulated intermediate output voltage. The dc supply voltage is sensed for an overvoltage protection function. By sensing the intermediate regulated output voltage in the voltage control loop and by sensing the dc supply voltage for overvoltage protection, a component failure is less likely to affect both functions than if a single voltage was sensed for both functions. The pulse-width modulation stage waits a predetermined delay time after start up for the output voltage to rise before beginning the pulse-width modulation function. The delay time is determined by an amount of time taken to charge a capacitor to a predetermined voltage after start up. The capacitor is charged by a current source that is switched on and off according to a clock signal such that the capacitor is charged only a portion of time. Therefore, a larger current source may be used than otherwise which results in more reliable control of the delay time.

27 Claims, 9 Drawing Sheets

U.S. PATENT DOCUMENTS

| | | |
|---|---|---|
| 4,677,366 | 6/1987 | Wilkinson et al. ............... 323/222 |
| 4,691,159 | 9/1987 | Ahrens et al. ................... 323/222 |
| 4,731,574 | 3/1988 | Melbert ........................... 323/275 |
| 4,736,151 | 4/1988 | Dishner ........................... 323/224 |
| 4,761,725 | 8/1988 | Henze .............................. 363/46 |
| 4,841,220 | 6/1989 | Tabisz et al. ................... 323/282 |
| 4,845,420 | 7/1989 | Oshizawa et al. .............. 323/222 |
| 4,920,309 | 4/1990 | Szepesi ........................... 323/269 |
| 4,929,882 | 5/1990 | Szepesi ........................... 323/222 |
| 4,940,929 | 7/1990 | Williams .......................... 323/222 |
| 4,941,080 | 7/1990 | Sieborger ........................ 363/127 |
| 4,947,309 | 8/1990 | Jonsson ........................... 363/17 |
| 4,975,823 | 12/1990 | Rilly et al. ..................... 363/56 |
| 5,028,861 | 7/1991 | Pace et al. ..................... 323/222 |
| 5,034,873 | 7/1991 | Feldtkeller ..................... 363/21 |
| 5,138,294 | 8/1992 | Capel .............................. 323/283 |
| 5,146,399 | 9/1992 | Gucyski .......................... 363/89 |
| 5,278,490 | 1/1994 | Smedley .......................... 323/284 |
| 5,359,281 | 10/1994 | Barrow et al. ................. 323/284 |
| 5,412,308 | 5/1995 | Brown ............................. 323/267 |
| 5,414,341 | 5/1995 | Brown ............................. 323/268 |
| 5,434,767 | 7/1995 | Batarseh et al. ............... 363/16 |
| 5,440,473 | 8/1995 | Ishii et al. ...................... 363/21 |
| 5,450,000 | 9/1995 | Olsen .............................. 323/222 |
| 5,457,621 | 10/1995 | Munday et al. ................ 363/56 |
| 5,457,622 | 10/1995 | Arakawa ......................... 363/59 |
| 5,461,302 | 10/1995 | Garcia et al. ................... 323/222 |
| 5,479,089 | 12/1995 | Lee ................................. 323/283 |
| 5,481,178 | 1/1996 | Wilcox et al. .................. 323/287 |
| 5,485,361 | 1/1996 | Sokal .............................. 363/21 |
| 5,491,445 | 2/1996 | Moller et al. ................... 327/540 |
| 5,502,370 | 3/1996 | Hall et al. ....................... 323/284 |
| 5,532,577 | 7/1996 | Doluca ............................ 323/282 |
| 5,552,695 | 9/1996 | Schwartz ......................... 323/271 |
| 5,565,761 | 10/1996 | Hwang ............................ 323/222 |
| 5,568,041 | 10/1996 | Hesterman ...................... 323/207 |
| 5,592,071 | 1/1997 | Brown ............................. 323/282 |
| 5,592,128 | 1/1997 | Hwang ............................ 331/61 |
| 5,610,502 | 3/1997 | Tallant, II et al. .............. 323/222 |
| 5,617,306 | 4/1997 | Lai et al. ......................... 363/17 |
| 5,627,460 | 5/1997 | Bazinet et al. .................. 323/288 |

OTHER PUBLICATIONS

"ML4863 High Efficiency Flyback Controller", Micro Linear Corporation, Feb. 1995.

"ML4863EVAL User's Guide High Efficiency Flyback Controller", Micro Linear Corporation, Feb. 1995.

"Off–Line And One–Cell IC Converters Up Efficiency", Frank Goodenough, Electronic Design, pp. 55–56, 58, 60, 62–64, Jun. 27, 1994.

"Designing with hysteretic current–mode control", Gedaly Levin and Kieran O'Malley, Cherry Semi–Conductor Corp., EDN, pp. 95–96, 98, 100–102, Apr. 28, 1994.

"Analysis of the Flyback Converter Operating in Current–Mode Pulse–Frequency Modulation", Urs Mader and K. Kit Sum, Micro Linear Corporaton, Apr. 17, 1994.

"Step–Up/Step Down Converters Power Small Portable Systems", Bruce D. Moore, EDN, pp. 79–84, Feb. 3, 1994.

"ML4861 Low Voltage Boost Regulator", Micro Linear Corporation, Jun. 1993.

"11. Variable Frequency Converters", K. Kit Sum, pp. 96–97, 134–135, 1993.

"3.3V/5V/Adjustable Output, Step–Up, DC–DC Converters", Maxim Integrated Products, pp. 1–8, 1993.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"Small–Signal High–Frequency Analysis Of The Free–Running Current–Mode–Controlled Converter", Richard Redl, pp. 897–906, IEEE, 1991.

"ML 4823 High Frequency Power Supply Controller," Micro Linear Corporation, Dec. 1994.

"ML4863 High Efficiency Battery Pack Converter (Preliminary)", Micro Linear Corporation, Jun. 1994.

"ML 4880 Portable PC/PCMCIA Power Controller (Preliminary)", Mirco Linear Corporation, Oct. 1995.

ONE PIN ERROR AMPLIFIER AND SWITCHED SOFT-START FOR AN EIGHT PIN PFC-PWM COMBINATION INTEGRATED CIRCUIT CONVERTER CONTROLLER

This is a continuation-in-part of application Ser. No. 08/670,181 filed Jun. 20, 1996, the contents of which are hereby incorporated by reference.

FIELD OF THE INVENTION

The invention relates to a combination power factor correction and pulse-width modulation converter controller. More particularly, the invention relates to a combination power factor correction and pulse-width modulation converter controller having a low pin count integrated circuit package, redundant voltage limiting loops in the power factor correction stage and a switched current source for soft-start in the pulse-width modulation stage.

BACKGROUND OF THE INVENTION

In a typical switching mode power converter, the output voltage is controlled by an electronic circuit that measures a level of the output voltage, compares that measured level to a predetermined desired level, and develops a response to that comparison elsewhere in the circuit in order to accurately regulate the output voltage. A prior art switching mode power converter that uses a trailing edge modulation control scheme is illustrated in FIG. 1. The input voltage VIN is coupled to a first terminal of an inductor L0. A second terminal of the inductor L0 is coupled to a first terminal of a switch SW0 and to an anode of a diode D0. A capacitor C0 is coupled between a cathode of the diode D0 and a second terminal of the switch SW0. A load RL is coupled across the capacitor C0. A potentiometer PT1 is coupled across the load RL and provides a negative input to an error amplifier 10. A reference voltage VREF1 is coupled to a positive input to the error amplifier 10. An output VEAO of the error amplifier 10 is coupled to a positive input to a pulse-width modulating comparator 14. A negative input to the comparator 14 is coupled to receive a ramp output of an oscillator 12. An output of the comparator 14 is coupled as an inverted reset input $\overline{R}$ of a flip-flop 16. An input D of the flip-flop 16 is coupled to an inverted output $\overline{Q}$ of the flip-flop 16. A clock input CLK of the flip-flop 16 is coupled to a clock output of the oscillator 12. An output Q of the flip-flop 16 is coupled to control the state of the switch SW0.

The output voltage VOUT supplied to the load RL is formed by integrating the inductor current I1 in the capacitor C0. Pulse-width modulation (PWM) is used to maintain a constant output voltage VOUT when the input voltage VIN or load impedance varies over time. By modulating the width of voltage pulses that control the switch SW0, the output voltage VOUT can be maintained at a constant level. Energy from the input source VIN is stored in the inductor L0 when the switch SW0 is closed. When the switch SW0 is open, energy from the inductor L0 is transferred to the capacitor C0 and to the load RL. A predetermined fraction of the output voltage VOUT is formed by the potentiometer PT1. This voltage VEA is input into the negative terminal of the error amplifier 10 for comparison to the reference voltage VREF1. The comparison determines how close the actual output voltage VOUT is to the desired output voltage and is used to modulate the width of the pulses that control the switch SW0.

The circuit illustrated in FIG. 1 utilizes trailing edge pulse-width modulation for controlling the switch SW0. In trailing edge modulation, the switch SW0 turns on (closes) on the trailing edge of the clock signal. The leading edge of the clock signal may also be utilized to implement leading edge modulation. For a leading edge modulation control, the inputs to the error amplifier 10 are be reversed; the voltage VEA from the potentiometer PT1 is coupled to the positive terminal of the voltage error amplifier 10 and the reference voltage VREF1 is coupled to the negative terminal of the voltage error amplifier 10.

The switch SW0 turns on after the trailing edge of the system clock. Once the switch SW0 is on, the inductor current IL will ramp up and the modulating comparator 14 then compares the error amplifier output voltage VEAO and the modulating ramp RAMP. When the signal RAMP is higher than the signal VEAO, the output of the comparator 14 will fall to a logical low voltage level. Due to the inverter at its input, the input R of the flip-flop 16 will then rise to a logical high voltage level thereby resetting the output Q of the flip-flop 16 to a logical low voltage level and turning off the switch SW0. The duty cycle is determined as a ratio of the on time of the switch to its off time.

While the above-described circuit accurately regulates the output voltage despite variations in the load impedance, it does not ensure that the input current follows the input voltage in time and amplitude proportionally. When a power converter such as is shown in FIG. 1 is coupled to receive a rectified line voltage, it can cause problems in a power distribution system, such as reducing the capacity of the distribution system, increasing harmonics and overheating substation transformers. Therefore, it is desirable that a power converter ensure that the input current follow the line voltage such that the power converter is substantially a resistive load to the power line. A power factor correction circuit ensures that the input current follows the line voltage in time and amplitude proportionally (i.e. the input voltage and current are maintained in phase relative to each other).

A circuit diagram of a boost rectifier circuit including power factor correction is illustrated in FIG. 2. A line voltage is coupled to the input terminals of a full wave bridge rectifier 18. A first output terminal of the full wave bridge rectifier 18 is coupled to a first terminal of an inductor L1 and to a first input terminal of a multiplier 20. A second terminal of the inductor L1 is coupled to a drain of an NMOS transistor SW1 and to an anode of a diode D1. A source of the NMOS transistor SW1 is coupled to the ground node.

A cathode of the diode D1 is coupled to a first terminal of a capacitor C1 and to an output node Vout. A second terminal of the capacitor C1 is coupled to the ground node. A first terminal of a resistor Rc is coupled to the output node Vout. A second terminal of the resistor Rc is coupled to a negative input of an output voltage error amplifier 22 and to a first terminal of a resistor Rd. A second terminal of the resistor Rd is coupled to the ground node. A positive input of the amplifier 22 is coupled to a reference voltage VREF2. An output of the amplifier 22 is coupled to a second input of the multiplier 20.

An output of the multiplier 20 is coupled to a positive input terminal of a current error amplifier 24 and to a first terminal of a resistor Ra. A second terminal of the resistor Ra is coupled to a second output terminal of the full wave bridge rectifier 18 and to a first terminal of a sense resistor Rs. A second terminal of the sense resistor Rs is coupled to a first terminal of a resistor Rb and to the ground node. A second terminal of the resistor Rb is coupled to a negative input terminal of the amplifier 24. An output of the current error amplifier 24 is coupled to a negative input terminal of a modulating comparator 26. A ramp output of an oscillator 28 is coupled to a positive input terminal of the modulating comparator 26. An output of the modulating comparator 26 is coupled as an input R of a flip-flop 30. A clock output of the oscillator 28 is coupled as an input S of the flip-flop 30. An output Q of the flip-flop 30 is coupled to a gate of the NMOS transistor SW1.

The output of the multiplier 20 is a current which is the product of a reference current, the output of the voltage error amplifier 22 and a gain factor. This output current is applied to the resistor Ra. The voltage across the resistor Ra subtracts from the sensed voltage across the sense resistor Rs and is applied to the current error amplifier 24. Under closed loop control, the current error amplifier 24 will try to keep this voltage differential near the zero volt level. This forces the voltage produced by the return current flowing through the sense resistor Rs to be equal to the voltage across the resistor Ra.

The amplified current error signal output from the current error amplifier 24 is then applied to the negative input to the modulating comparator 26. The positive input to the modulating comparator 26 is coupled to receive the ramp signal output from the oscillator 28. Pulse-width modulation is obtained when the amplified error signal that sets the trip point modulates up and down.

Thus, a current control loop modulates the duty cycle of the switch SW1 in order to force the input current to follow the waveform of the full wave rectified sinewave input voltage. The current control loop and the power delivery circuitry must have at least enough bandwidth to follow this waveform.

The above-described power factor correction circuit ensures that the input current follows the line voltage such that the power converter is substantially a resistive load to the power line while the above-described pulse-width modulation circuit accurately regulates the output voltage despite variations in load impedance. Thus, it is often desirable to utilize a power factor correction circuit as a first stage of a converter coupled to a pulse-width modulation circuit as a second stage of the converter, thus forming a combination power factor correction and pulse-width modulation converter. Integrated circuits that utilize this technique require at least 16 pins. An example of such a circuit is available under part number ML4824 from Micro Linear Corporation, located at 2092 Concourse Drive, San Jose, Calif. Further, to minimize cost, it is also desirable for a circuit for controlling such a combination converter to be integrated in a package having only a few pins that require connection to discrete components.

SUMMARY OF THE INVENTION

The invention is a combination PFC-PWM integrated circuit converter controller having both a power factor correction input stage and a pulse-width modulation output stage. The power factor correction stage provides unity power factor and a regulated intermediate output voltage by sensing a current in the power factor correction circuit and by sensing the regulated intermediate output voltage in a voltage control loop. The regulated intermediate output voltage is sensed by an error amplifier that includes a current mirror.

A circuit for generating a dc supply voltage is coupled to the power factor correction stage for providing power to the integrated circuit. The dc supply voltage is representative of the regulated intermediate output voltage and is sensed for an overvoltage protection function. By sensing the intermediate regulated output voltage in the voltage control loop and by sensing the dc supply voltage for overvoltage protection, a component failure is less likely to affect both functions than if a single voltage was sensed for both functions. Thus, the converter includes redundant voltage limiting loops.

The pulse-width modulation stage includes a soft-start function which waits a predetermined delay time after start up for an output voltage of the pulse-width modulation stage to rise before beginning to regulate the output voltage. The delay time is determined by an amount of time taken for a current source to charge a capacitor to a predetermined voltage after start up. The current source is switched on and off according to a clock signal such that the capacitor is charged during periodic intervals. Therefore, a larger current source may be used than otherwise which results in more reliable control of the delay time.

DETAILED DESCRIPTION OF THE PREFERRED EMBODIMENT

Figure 3A:
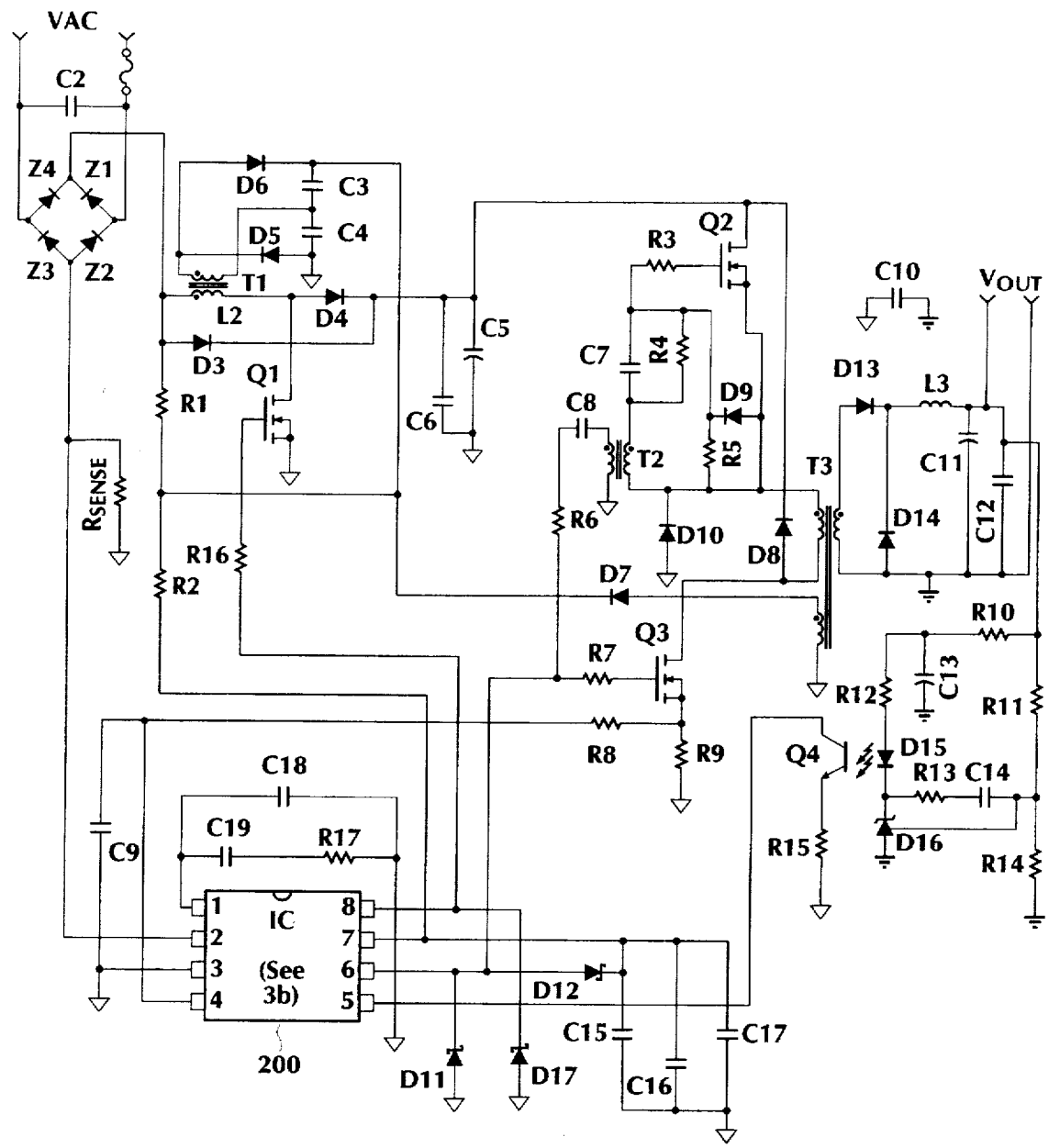
FIG. 3 illustrates a circuit diagram according to the present invention of a PFC-PWM converter, including an integrated circuit controller and external components for implementing a power factor correction stage, a pulse-width modulation stage and for generating a supply voltage.
Figure 3B:
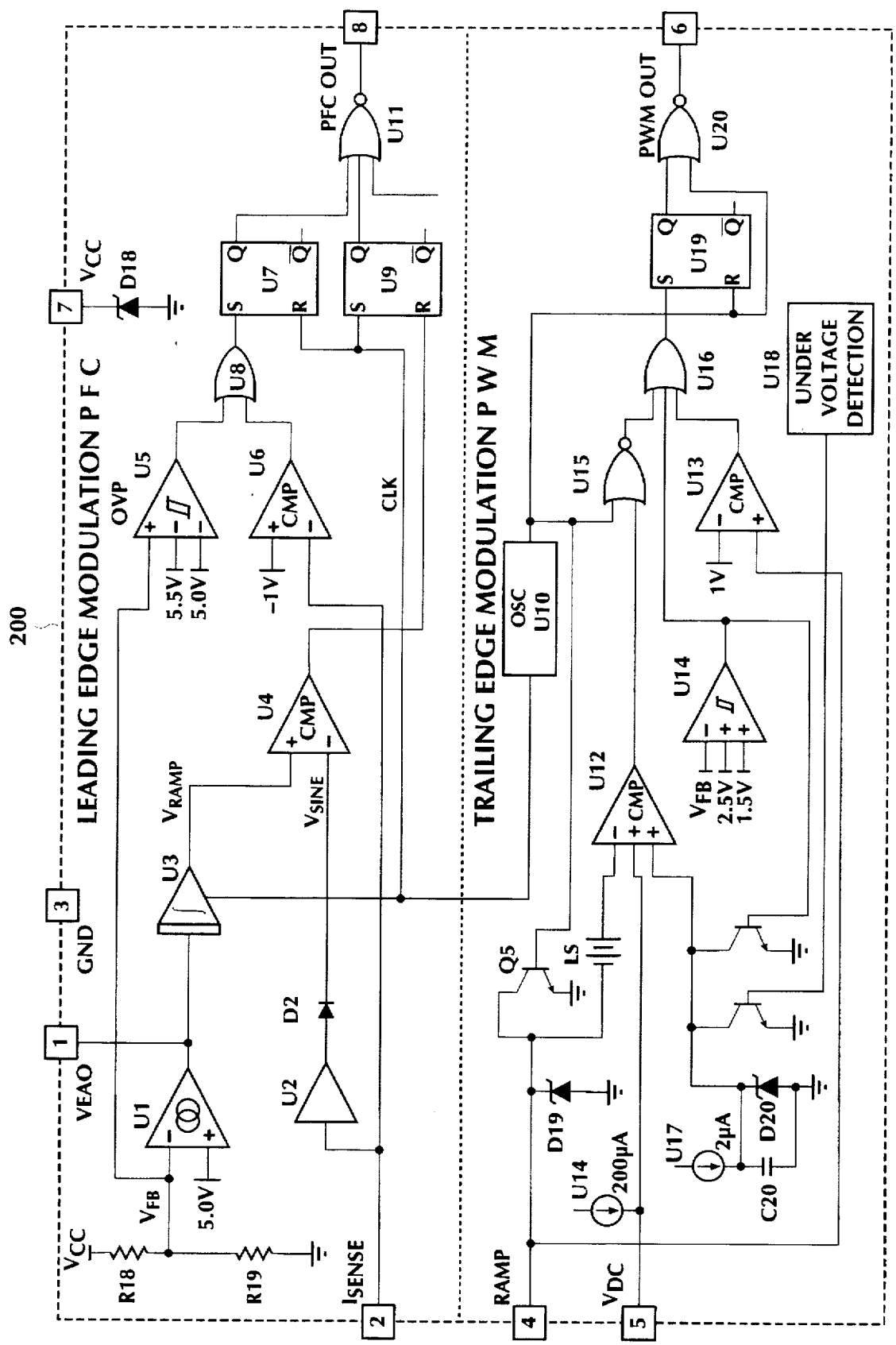

FIG. 3 illustrates a circuit diagram of a PFC-PWM converter, including an integrated circuit controller 200 and external components for implementing a power factor correction stage, a pulse-width modulation stage and for generating a supply voltage VCC. Portions of FIG. 3 include circuit elements that are external to the integrated circuit 200. It will be apparent to one of ordinary skill in the art that the portions of the circuit external to the integrated circuit 200 are exemplary. Other external circuits can be coupled to the integrated circuit 200 to obtain a circuit according to the teachings of the present invention. A first terminal of an AC voltage source VAC is to coupled to a first terminal of a capacitor C2 and to a first input terminal of a full-wave rectifier comprising diodes Z1, Z2, Z3, Z4. A second terminal of the AC voltage source is coupled to a second terminal of the capacitor C2 and to a second input terminal of the rectifier. A first output terminal of the rectifier is coupled to a first terminal of an inductor L2, to an anode of a diode D3 and to a first terminal of a resistor R1. A second terminal of the inductor L2 is coupled to an anode of a diode D4 and to a drain of an NMOS transistor Q1. A source of the transistor Q1 is coupled to a primary ground node.

The inductor L2 is a primary winding of a transformer T1 wherein the first terminal of the inductor L2 is designated with a "dot" according to the dot convention for designating winding polarity. A first terminal of a secondary winding of the transformer T1 is designated with a dot and is coupled to a cathode of a diode D5 and to an anode of a diode D6. A cathode of the diode D6 is coupled to a first terminal of a capacitor C3, to a second terminal of the resistor R1, to a first terminal of a resistor R2 and to a cathode of a diode D7.

A second terminal of the capacitor C3 is coupled to a first terminal of a capacitor C4 and to a second terminal of the secondary winding of the transformer T1. An anode of the diode D5 is coupled to a second terminal of the capacitor C4 and coupled to the primary ground node. A cathode of the diode D3 is coupled to a cathode of the diode D4, to a first terminal of a capacitor C5, to a first terminal of a capacitor C6, to a drain of an NMOS transistor Q2 and to a cathode of a diode D8. A second terminal of the capacitor C5 and a second terminal of the capacitor C6 are coupled to the primary ground node.

A second output terminal of the rectifier comprising the diodes Z1, Z2, Z3, Z4, is coupled to a first terminal of a resistor RSENSE and to a pin 2, labelled ISENSE, of the integrated circuit 200. A second terminal of the resistor RSENSE is coupled to the primary ground node.

A gate of the transistor Q2 is coupled to a first terminal of a resistor R3. A second terminal of the resistor R3 is coupled to a first terminal of a resistor R4, to a first terminal of a capacitor C7, to a first terminal of a resistor R5 and to a cathode of a diode D9. A second terminal of the resistor R4 is coupled to a second terminal of the capacitor C7 and to a first terminal of a secondary winding of a transformer T2 wherein the first terminal of the secondary winding is designated with a dot. A second terminal of the secondary winding of the transformer T2 is coupled to an anode of the diode D9, to a second terminal of the resistor R5, to a source of the transistor Q2, to a first terminal of a primary winding of a transformer T3, designated with a dot, and to a cathode of a diode D10.

A first terminal, designated with a dot, of a primary winding of the transformer T2 is coupled to a first terminal of a capacitor C8. A second terminal of the primary winding of the transformer T2 is coupled to the primary ground node. A second terminal of the capacitor C8 is coupled to a first terminal of a resistor R6. A second terminal of the resistor R6 is coupled to a first terminal of a resistor R7, to a pin 6, labelled PWMOUT, of the integrated circuit 200, to a cathode of a Zener diode D11 and to an anode of a Zener diode D12. A second terminal of the resistor R7 is coupled to a gate of an NMOS transistor Q3. An anode of the diode D11 is coupled to the primary ground node. A drain of the transistor Q3 is coupled to an anode of the diode D8 and to a second terminal of the primary winding of the transformer T3.

A source of the transistor Q3 is coupled to a first terminal of a resistor R8 and to a first terminal of a resistor R9. A second terminal of the resistor R8 is coupled to a first terminal of a capacitor C9 and to a pin 4, labelled IRAMP, of the integrated circuit 200. A second terminal of the capacitor C9 and a second terminal of the resistor R9 are coupled to the primary ground node. A first terminal, designated with a dot, of a first secondary winding of the transformer T3 is coupled to an anode of a diode D13. A cathode of the diode D13 is coupled to a cathode of a diode D14 and to a first terminal of an inductor L3.

A second terminal of the first secondary winding of the transformer T3 is coupled to a secondary ground node. A first terminal, designated with a dot, of a second secondary winding of the transformer T3 is coupled an anode of the diode D7. A second terminal of the second secondary winding of the transformer T3 is coupled to the primary ground node. An anode of the diode D14 and a first terminal of a capacitor C10 are coupled to the secondary ground node. A second terminal of the capacitor C10 and an anode of the diode D10 are coupled to the primary ground node. A second terminal of the inductor L3 is coupled to a first terminal of a capacitor C11, to a first terminal of a capacitor C12, to an output node VOUT, to a first terminal of a resistor R10 and to a first terminal of a resistor R11. A second terminal of the capacitor C11 and a second terminal of the capacitor C12 are coupled to the secondary ground node.

A second terminal of the resistor R10 is coupled to a first terminal of a resistor R12 and to a first terminal of a capacitor C13. A second terminal of the resistor R12 is coupled to an anode of a light emitting diode D15. A second terminal of the diode D15 is coupled to a first terminal of a resistor R13 and to a cathode of a diode D16. Light from the diode D15 is coupled to control a transistor Q4. A second terminal of the resistor R13 is coupled to a first terminal of a capacitor C14. A second terminal of the capacitor C14 is coupled to a second terminal of the resistor R11, to a first terminal of a resistor R14 and coupled to a control terminal of the diode D16. An anode of the diode D16, a second terminal of the resistor R14 and a second terminal of the capacitor C13 are coupled to the secondary ground node.

An emitter of the transistor Q4 is coupled to a first terminal of a resistor R15. A second terminal of the resistor R15 is coupled to the primary ground node. A collector of the transistor Q4 is coupled to a pin 5, labelled VDC, of the integrated circuit 200. A gate of the transistor Q1 is coupled to a first terminal of a resistor R16. A second terminal of the resistor R16 is coupled to a pin 8, labelled PFCOUT, of the integrated circuit 200 and to a cathode of a zener diode D17. An anode of the diode D17 is coupled to the primary ground node.

A cathode of the diode D12 is coupled to a second terminal of the resistor R2, to a first terminal of a capacitor C15, to a first terminal of a capacitor C16, to a first terminal of a capacitor C17 and to a pin 7, labelled VCC, of the integrated circuit 200. A second terminal of the capacitor C15, a second terminal of a capacitor C16 and a second terminal of a capacitor C17 are coupled to the primary ground node. A pin 1, labeled VEAO, of the integrated circuit 200 is coupled to a first terminal of a capacitor C18 and to a first terminal of a capacitor C19. A second terminal of the capacitor C19 is coupled to a first terminal of a resistor R17. A second terminal of the capacitor C18, a second terminal of the resistor R17 and a pin 3, labelled GND, of the integrated circuit 200 are coupled to the primary ground node.

Referring to portions of FIG. 3 internal to the integrated circuit 200, pin 2 is coupled as an input to an amplifier U2 having a gain of minus eight and to a negative input to a comparator U6. A positive input to the comparator U6 is coupled to a −1.0 volts reference voltage. An output of the amplifier U2 is coupled to an anode of a diode D2. A cathode of the diode D2 is coupled to a positive input to a comparator U4. A first terminal of a resistor R18 is coupled to VCC (pin 7). A second terminal of the resistor R18 forms a node VFB and is coupled to a negative input to an amplifier U1 and to a first terminal of a resistor R19. A second terminal of the resistor R19 is coupled to the primary ground node. A positive input to the amplifier U1 is coupled to a reference voltage of 5.0 volts. An output of the amplifier U1 is coupled to the pin 1 and coupled to an input to an integrator circuit U3. An output of the integrator circuit U3 is coupled to a positive input to the comparator U4. The integrator circuit U3 is also coupled to receive a clock signal from an oscillator U10 for initializing the integrator circuit U3.

A positive input to a hysteretic comparator U5 is also coupled to the node VFB. A first negative input to the hysteretic comparator U5 is coupled to a 5.5 volts reference voltage. A second negative input to the hysteretic comparator U5 is coupled to a 5.0 volts reference voltage. An output of the comparator U5 is coupled to a first input to an OR gate U8. An output of the comparator U6 is coupled to a second input to the OR gate U8. An output of the OR gate U8 is coupled to a set input S of a flip-flop U7. An output of the comparator U4 is coupled to a reset input R of a flip-flop U9. A reset input R of the flip-flop U7 and a set input S of the flip-flop U9 are coupled to receive the clock signal from the oscillator U10.

A Q output of the flip-flop U7 is coupled to a first input to a NOR gate U11. A Q output of the flip-flop U9 is coupled to a second input to the NOR gate U11. An output of the NOR gate U11 is coupled to the pin 8. A cathode of a Zener diode D18 is coupled to the pin 7 for receiving VCC. An anode of the diode D18 is coupled to the primary ground node.

The pin 4 is coupled to a cathode of a zener diode D19, to a negative terminal of a 1.25 volt level shift circuit LS, to a positive input to a comparator U13 and coupled to a collector of an npn bipolar transistor Q5. A positive terminal of the 1.25 volt level shift circuit LS is coupled to a negative input to a comparator U12. A negative input to the comparator U13 is coupled to a reference voltage of 1.0 volt. An anode of the diode D19 is coupled to the primary ground node. A pin 5 of the integrated circuit 200 is coupled to a first positive input to the comparator U12 and coupled to receive a current of 200 micro-amps from a current source U14. A negative input to an hysteretic comparator U14 is coupled to the node VFB. A first positive input to the hysteretic comparator U14 is coupled to a 12.5 volts reference voltage. A second positive input to the hysteretic comparator is coupled to a 11.5 volts reference voltage.

An output of the hysteretic comparator U14 is coupled to a base of an npn bipolar transistor Q7 and to a first input to an OR gate U16. A collector of the transistor Q7 is coupled to a second positive input to a comparator U12, to a collector of an npn bipolar transistor Q6, to a cathode of a zener diode D20, to a first terminal of a capacitor C20 and coupled to receive a current of 2 micro-amps from a current source U17. An output of the comparator U12 is coupled to a first input to a NOR gate U15. An emitter of the transistor Q7, an emitter of the transistor Q6, an anode of the diode D20 and a second terminal of the capacitor C20 are coupled to the primary ground node. A base of the transistor Q6 is coupled to an under voltage detector circuit U18.

An output of the comparator U13 is coupled to a second input to the OR gate U16. An output of the NOR gate U15 is coupled to a third input to the OR gate U16. An output of the OR gate U16 is coupled to a set input S of a flip-flop U19. A Q output of the flip-flop U19 is coupled to a first input to a NOR gate U20. The oscillator U10 is coupled to provide a clock signal to a base of the transistor Q5, to a second input to the NOR gate U15, to a reset input R of the flip-flop U19 and to a second input to the NOR gate U20. An output of the NOR gate U20 is coupled to pin 6 of the integrated circuit.

The power factor correction circuit according to the invention compares a signal, VRAMP, formed at the output of the integrator circuit U3, with a signal, VSINE, formed at the cathode of the diode D2 to control the duty cycle of the switch Q1 and to ensure that the rectifier input current follows the line voltage. When the value of the signal, VRAMP, exceeds the value of the signal, VSINE, the output of the comparator U4 rises to a logical high voltage level. The switch Q1 is then closed on the next rising edge of the clock signal. The signal, VSINE, is representative of the current flowing through the inductor L2.

Figure 1:
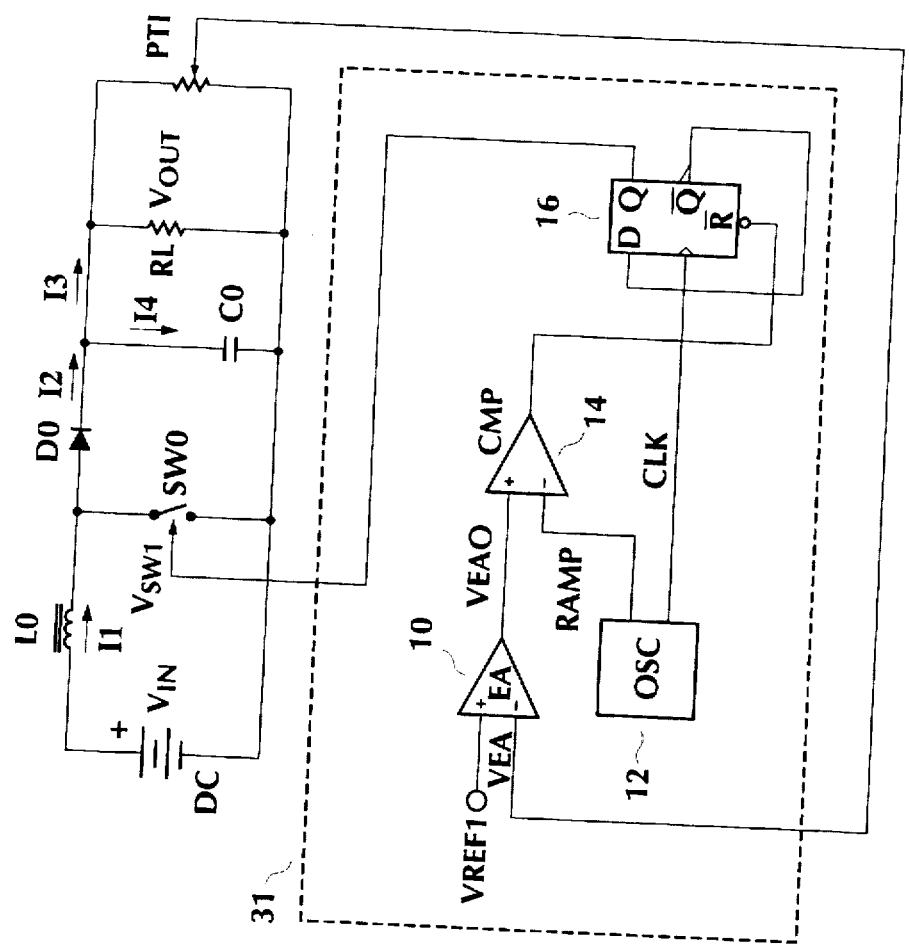
FIG. 1 illustrates a prior art circuit diagram of a switching mode power converter that uses a trailing edge modulation.
Figure 2:
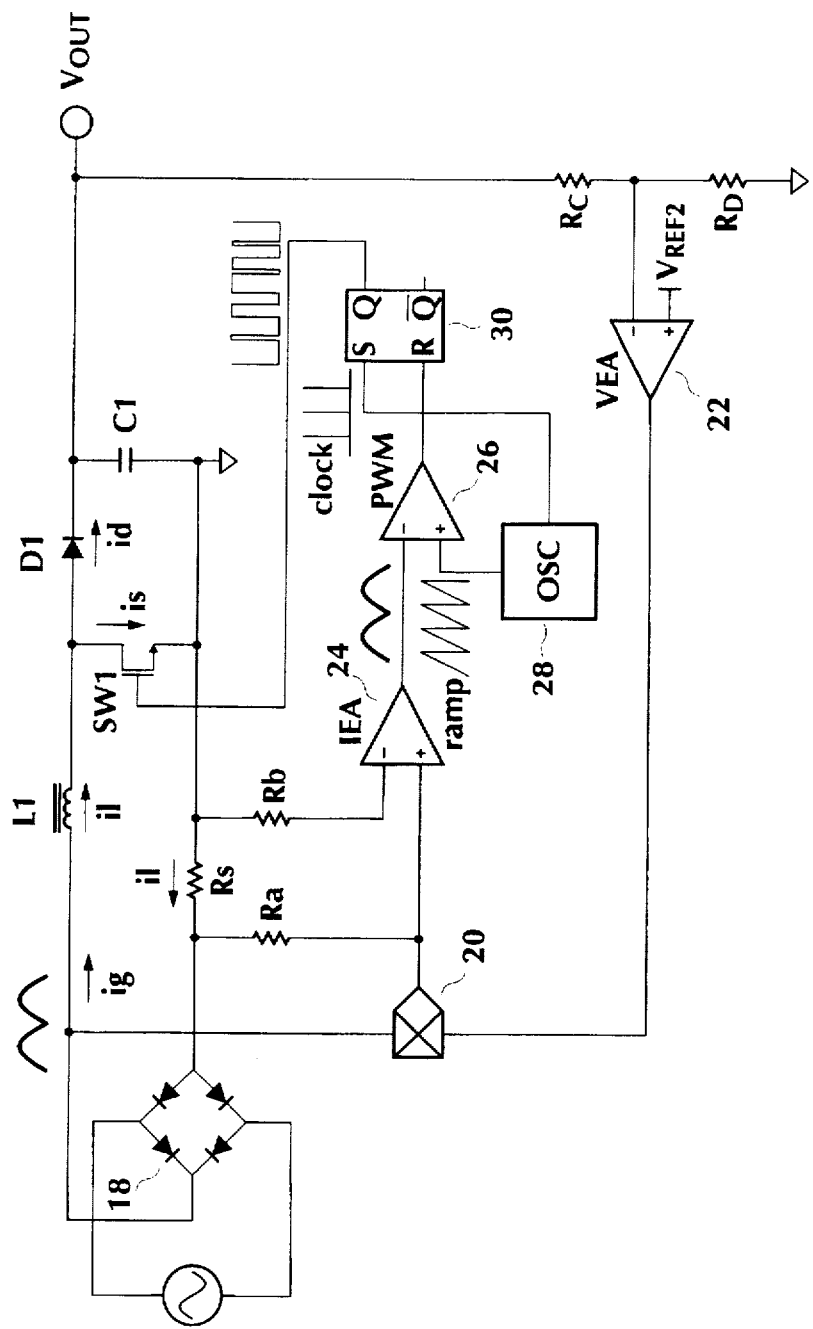
FIG. 2 illustrates a prior art circuit diagram of a boost rectifier circuit including pulse-width modulation and power factor correction.

Rather than utilizing a feedback signal from a resistive divider or potentiometer, such as is illustrated in FIGS. 1 and 2, the invention integrates a signal, VFB, for each clock cycle. VFB is proportionate to the dc supply voltage VCC which is formed by the circuit coupled to the secondary winding of the transformer T1 and is representative of the output voltage. Integrating VFB eliminates the need for a separate pin to couple the output voltage to the integrated circuit 200, as required by prior circuits. Note that in FIG. 3, the integrated circuit 200 requires only 8 pins to implement both the power factor correction and pulse-width modulation functions.

In FIG. 3, a signal, CLOCK, is the clock signal generated by the oscillator U10. The signal, VSINE, is the signal at the negative input to the comparator U4. The signal, VRAMP, is the signal at the positive input to the comparator U4. A signal, ISENSE, is the signal at the input to U2.

During a period of the clock signal, the signal, VRAMP, rises until it is reset by the leading edge of the clock signal, CLOCK, to the integrator circuit U3. Resetting the integrator assures that the signal, VRAMP, will have proper initial conditions for each clock cycle. At the beginning of the period of the clock signal, when the transistor Q1 (switch) is open, the output of the integrator U3, VRAMP, rises. The switch Q1 is closed at the next leading edge of the clock signal after the signal, VRAMP, exceeds the value of the waveform VSINE. Thus, the power factor correction circuit utilizes leading edge modulation.

Because the current flows from ground through the sense resistor RSENSE, the voltage signal at the pin 2 to the integrated circuit is negative. Therefore, the amplifier U2 has a negative gain so that the signal, VSINE, has positive polarity for comparison with the signal VRAMP.

The voltage signal, ISENSE, represents the level of current flowing through the resistor RSENSE, which is input to the amplifier U2 is also input to the comparator U6. The signal, ISENSE, is also representative of the current signal from the AC supply flowing in the inductor L2. If the value of this voltage signal falls below −1 volts, then the output of the comparator U6 will rise to a logical high voltage. When the output of the comparator U6 rises to a logical high voltage, the output Q of the flip-flop U7 will rise to logical high voltage level, causing the output of the NOR gate U11 to fall to a logical low voltage level and the switch Q1 will be opened.

At the leading edge of the clock signal, the output of the NOR gate U11 falls to a logical low voltage level which opens the switch Q1. The signals, VSINE and VRAMP, increase according to their respective generating circuits, over a clock period. When the signal, VRAMP, rises above the signal VSINE, the output of the comparator U4 rises to a logical high voltage causing the output Q of the flip-flop U9 to fall to logical low voltage level. Because all of the inputs to the NOR gate U11 are at a logical low voltage level, the output of the NOR gate U11 will rise to logical high voltage level, causing the switch Q1 to close.

The switch Q1 stays closed until the leading edge of the next clock pulse. On the leading edge of the clock pulse, the output Q of the flip-flop U7 is reset to logical low voltage level, the output of the flip-flop U9 is set to logical high voltage level, the output of the NOR gate U11 is a logical low voltage level, the switch Q1 is open and the integrator circuit U3 is reset to have initial output conditions of zero. The duty cycle of the switch Q1 is therefore set between the time the integrated signal VRAMP rises above the signal VSINE and the leading edge of the clock signal.

The signal, VRAMP, is generated by the amplifier U1 and the integrator U3 as shown in FIG. 3 and the signal, VSINE, is generated by the amplifier U2 and diode D2 as shown in FIG. 3.

The pulse-width modulation stage has as its input an intermediate output voltage formed by the power factor correction stage of approximately 380 volts d.c. across the capacitors C5 and C6. The pulse-width modulation section controls the transistor Q3 (SW3) to maintain a constant output voltage VOUT.

The pulse-width modulation stage of the power converter utilizes a trailing edge modulation scheme in which the duty cycle of the switch Q3 (SW3) is ideally held constant, but will vary as the voltage across the capacitors C5 and C6 varies. Preferably, a single clock signal of the oscillator U3 controls both stages to realize synchronous switching of the two stages, but separate clock signals could be utilized. The duty cycle of the second stage is ideally held constant at fifty percent, but will vary to maintain a constant output voltage VOUT. The pulse-width modulation stage operates in much the same manner as the pulse-width modulation stage shown in FIG. 1.

Because the circuit illustrated in FIG. 3 utilizes the feedback voltage, VFB, derived from VCC in a voltage control loop for controlling switching times by means of the transconductance amplifier U1 and for overvoltage protection by disabling switching by means of the comparator U5, it is possible that certain failure modes which prevent the voltage, VFB, from being sensed by the amplifier U1 and the comparator U5 can result in the output voltage rising to a undesirably high level. Therefore, an aspect of the invention includes a voltage control loop that is separate from the overvoltage protection function.

Figure 4A:
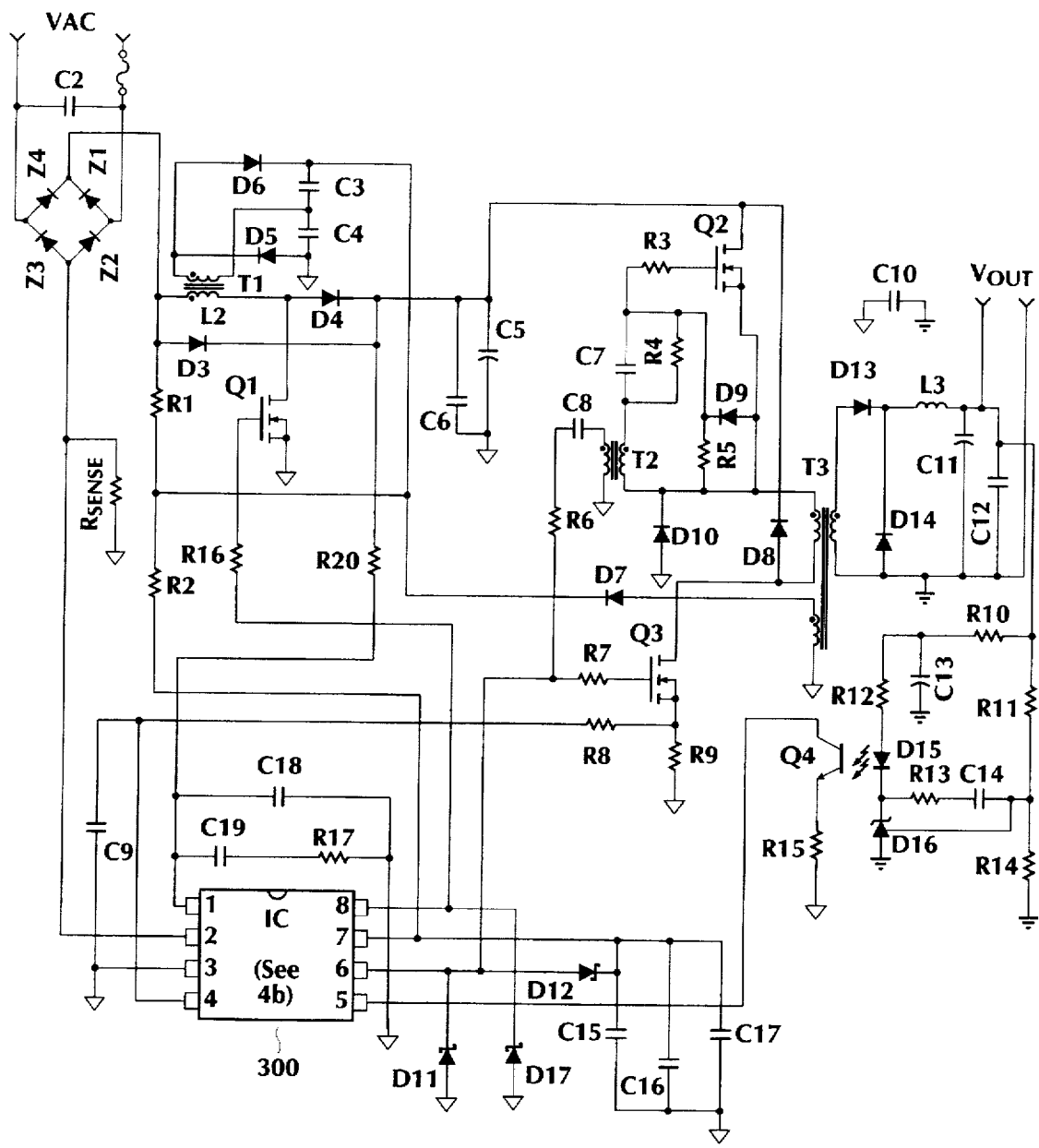
FIG. 4 illustrates a circuit diagram according to the present invention of a PFC-PWM converter, including an integrated circuit controller and external components for implementing a power factor correction stage, a pulse-width modulation stage and for generating a supply voltage and having redundant voltage control loops.
Figure 4B:
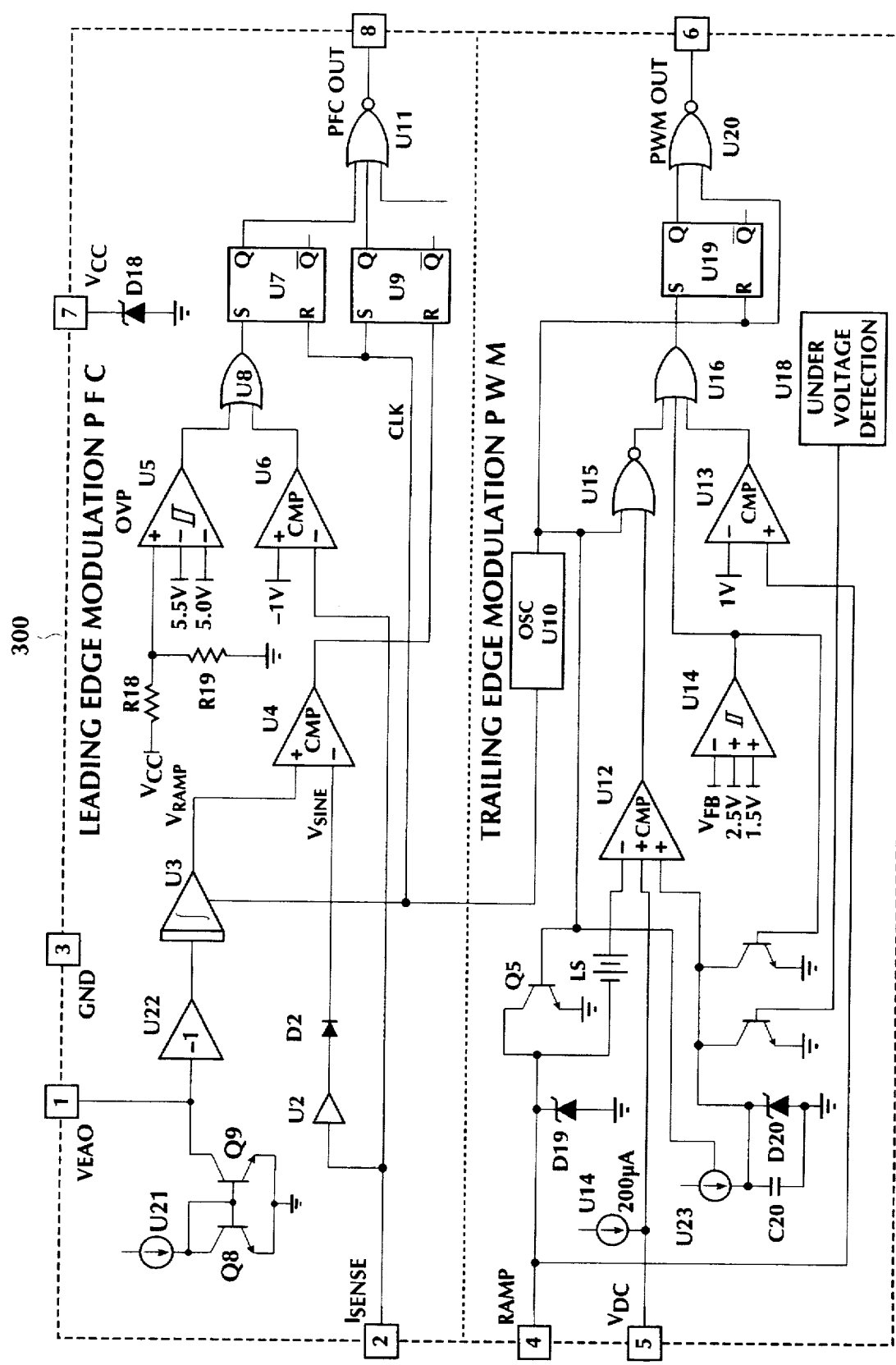

FIG. 4 illustrates a circuit diagram of a PFC-PWM converter, including an integrated circuit controller 300 and external components for implementing a power factor correction stage, a pulse-width modulation stage and for generating a supply voltage, VCC. The PFC-PWM converter illustrated in FIG. 4 also includes a voltage control loop that is separate from an overvoltage protection function. It is anticipated that the integrated circuit 300 will be available under part number ML4803 from Micro Linear Corporation, located at 2092 Concourse Drive, in San Jose, Calif., Zip Code 95131. The integrated circuit controller 300 illustrated in FIG. 4 is comparable to the integrated circuit controller 200 illustrated in FIG. 3 except for some important differences explained below. Elements of FIG. 3 having a one-to-one functional correspondence to the elements of FIG. 4 are given the same reference characters.

The PFC-PWM converter illustrated in FIG. 4 differs from the PFC-PWM converter illustrated in FIG. 3 in a first respect in that the amplifier U1 of FIG. 3 has been replaced in FIG. 4 with a current source U21, an npn transistor Q8, an npn transistor Q9 and an amplifier U22. Also, a resistor R20 has been added. Referring to FIG. 4, the current source U21 is coupled to provide a current to a collector of the transistor Q8, to a base of the transistor Q8 and to a base of the transistor Q9. An emitter of the transistor Q8 and an emitter of the transistor Q9 are coupled to the ground node. A first terminal of the resistor R20 is coupled to the cathode of the diode D3, to the cathode of the diode D4, to the first terminal of the capacitor C5, to the first terminal of the capacitor C6 and to the drain of the NMOS transistor Q2 and to the cathode of the diode D8. A second terminal of the resistor R20 is coupled to the pin 1, labeled VEAO, of the integrated circuit 300, to the first terminal of the capacitor C18, to the first terminal of the capacitor C19, to a collector of the transistor Q9 and to an input of the amplifier U22. An output of the amplifier U22 is coupled to the input to the integrator circuit U3.

Figure 5:
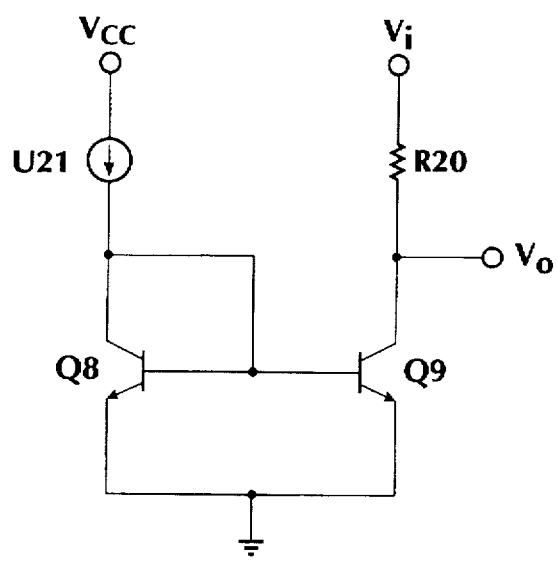
FIG. 5 illustrates an error amplifier for controlling the output voltage in the PFC-PWM converter illustrated in FIG. 4.

The transistors Q8 and Q9, the current source U21 and the resistor R20 are also illustrated in FIG. 5. The circuit illustrated in FIG. 5 functions as an error amplifier for controlling the output voltage in the PFC-PWM converter illustrated in FIG. 4. As illustrated in FIG. 5, a voltage Vi is applied to the first terminal of the resistor R20. In FIG. 4, this voltage is approximately 380 volts dc formed across the capacitors C5 and C6. As illustrated in FIG. 5, the voltage Vo is formed at the second terminal of the resistor R20. In FIG. 4, this voltage is applied to the amplifier U22 and is integrated by the integrator U3. The amplifier U22 preferably amplifies the output voltage, Vo, by minus one. Therefore, the amplifier U22 inverts the polarity of the output voltage, Vo to have the proper polarity for integration by the integrator circuit U3 and comparison to the signal, VSINE, by the comparator U4. Note that the transistors Q8 and Q9 can be replaced with MOS transistors coupled as a current mirror.

The current source U21 sources a constant current. Because the transistors Q8 and Q9 form a current mirror, a current proportionate to the current sourced by U21 also flows through the resistor R20. The voltage Vi has an expected quiescent value. The value for the resistor R20 can then be selected to determine the quiescent value for Vo. For example, the quiescent expected value for Vi is 380 volts dc, generated across the capacitors C5 and C6 by the PFC stage. The quiescent value for the output voltage, Vo, can be selected to be 10 volts. The current through the resistor R20 can be selected to be 10 uA. The value of the resistor R20 can then be calculated by subtracting 10 volts from 380 volts and dividing the result by 10 uA. Therefore, R20 in this example is 37 Megohms.

When the input voltage, Vi, changes from its quiescent value by an amount equal to $\Delta v$, the output voltage, Vo, also changes from its quiescent value by an amount equal to $\Delta v$. Because the quiescent value for the input voltage, Vi, is greater than the quiescent value for the output voltage, Vo, a change in the input voltage will have a proportionally greater effect on the output voltage. For example, assume that the input voltage Vi changes by $\Delta v$, where $\Delta v$ is equal to 5 volts. Thus, the input voltage, Vi, has changed by less than 2% (5 volts compared to 380 volts). The output voltage Vo will also change by the same $\Delta v$. Thus, the output voltage Vo, will have changed by approximately 50% (5 volts compared to 10 volts).

The voltage, VFB, is utilized by the hysteretic comparator U5 for overvoltage protection to prevent the output voltage from becoming excessive should a component failure occur. Because the input to the comparator U4 is derived from the intermediate output voltage, a component failure which affects either the voltage control loop or the overvoltage control function is less likely to affect the other of the two functions than if both the voltage control loop and the overvoltage protection function utilized the voltage, VFB. Therefore, the voltage control loop and overvoltage prevention functions of the circuit illustrated in FIG. 4 are independent from each other in comparison to the circuit illustrated in FIG. 3. Note, however, that no additional pins are required to implement the integrated circuit controller 300. Accordingly, the error amplifier comprising U21, Q8 and Q9, as illustrated in FIG. 4 requires only one pin (pin 1) of the integrated circuit controller 300 and the entire integrated circuit controller requires a total of only eight pins.

Figure 6:
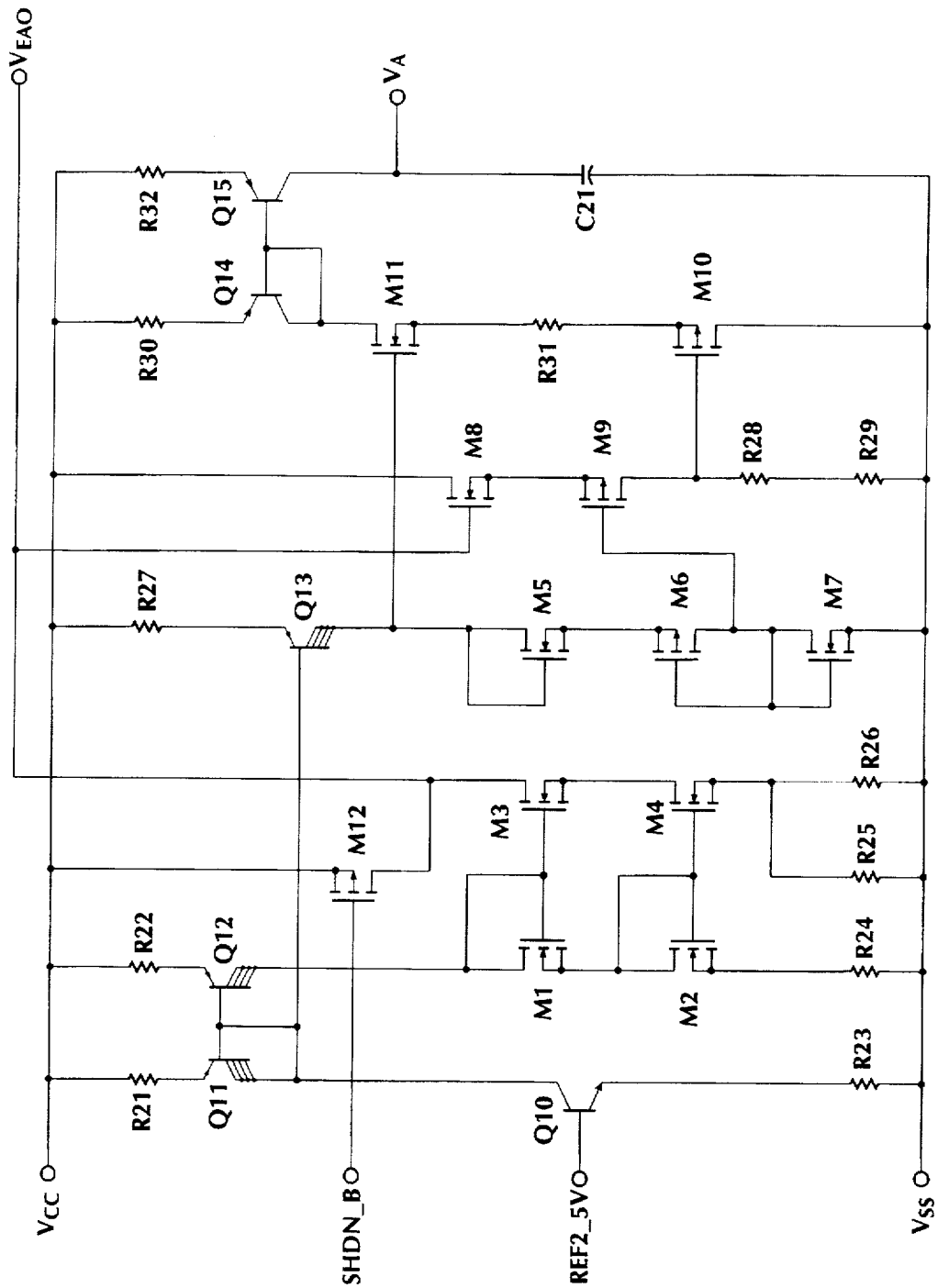
FIG. 6 illustrates a detailed schematic diagram of the error amplifier, inverter and integrator illustrated in FIG. 5.

FIG. 6 illustrates a detailed schematic diagram of the error amplifier, inverter and integrator illustrated in FIG. 5. The supply voltage VCC is coupled to a first terminal of a resistor R21, to a first terminal of a resistor R22, to a source of a PMOS transistor M12, to a first terminal of a resistor R27, to a drain of an NMOS transistor M8, to a first terminal of a resistor R30 and to a first terminal of a resistor R32. A second terminal of the resistor R21 is coupled to an emitter of a pnp bipolar transistor Q11. A second terminal of the resistor R22 is coupled to an emitter of a pnp bipolar transistor Q12. A base of the transistor Q11 is coupled to a base of the transistor Q12, to a collector of the transistor Q11, to a collector of an npn bipolar transistor Q10 and to a base of a pnp bipolar transistor Q13. A base of the transistor Q10 is biased by a volt reference voltage. An emitter of the transistor Q10 is coupled to a first terminal of a resistor R23. A second terminal of the resistor R23 is coupled to a supply voltage VSS.

A collector of the transistor Q12 is coupled to a drain of an NMOS transistor M1, to a gate of the NMOS transistor M1 and to a gate of an NMOS transistor M3. A source of the transistor M1 is coupled to a drain of an NMOS transistor M2, to a gate of the transistor M2 and to a gate of an NMOS transistor M4. A source of the transistor M2 is coupled to a first terminal of a resistor R24. A second terminal of the resistor R24 is coupled to VSS. A gate of the transistor M12 is coupled to be controlled by a shut-down control voltage SHDN. A drain of the transistor M12 is coupled to a drain of the transistor M3 and to a gate of an NMOS transistor M8, forming a node VEAO. A source of the transistor M3 is coupled to a drain of the transistor M4. A source of the transistor M4 is coupled to a first terminal of a resistor R25 and to a first terminal of a resistor R26. A second terminal of the resistor R25 and a second terminal of the resistor R26 are coupled to VSS.

A second terminal of the resistor R27 is coupled to an emitter of the transistor Q13. A collector of the transistor Q13 is coupled to a gate of a NMOS transistor M11, to a gate of an NMOS transistor M5 and to a drain of the transistor M5. A source of the transistor M5 is coupled to a source of a PMOS transistor M6. A gate of the transistor M6 is coupled to a gate of an NMOS transistor M7, to a drain of the transistor M6, to a drain of the transistor M7 and to a gate of a PMOS transistor M9. A source of the transistor M7 is coupled to VSS. A source of the transistor M8 is coupled to a source of the transistor M9. A drain of the transistor M9 is coupled to a gate of a PMOS transistor M10 and to a first terminal of a resistor R28. A second terminal of the resistor R28 is coupled to a first terminal of a resistor R29. A second terminal of the resistor R29 is coupled to VSS.

A second terminal of the resistor R30 is coupled to an emitter of a pnp bipolar transistor Q14. A collector of the transistor Q14 is coupled to a base of the transistor Q14, to a base of a pnp bipolar transistor Q15 and to a drain of the transistor M11. A source of the transistor M11 is coupled to a first terminal of a resistor R31. A second terminal of the resistor R31 is coupled to a source of the transistor M10. A drain of the transistor M10 is coupled to VSS. A second terminal of the resistor R32 is coupled to an emitter of a pnp bipolar transistor Q15. A collector of the transistor Q15 is coupled to a first terminal of a capacitor C21, forming a node VA. A second terminal of the capacitor C21 is coupled to VSS.

In FIG. 6, the transistor Q10 biases the transistor Q11 with a current. The current through the transistor Q11 is mirrored in the transistor Q12, such that a current in the transistor Q12 is proportionate to the current in the transistor Q11. Therefore, the transistors Q10, Q11 and Q12 comprise the current source U21 illustrated in FIGS. 4 and 5. The transistors M1, M2, M3 and M4 illustrated in FIG. 6 form a current mirror which corresponds to the current mirror formed by the transistors Q8 and Q9 illustrated in FIGS. 4 and 5. The signal, VEAO, is formed at the drain of the transistor M3 which corresponds the signal formed at the collector of the transistor Q9 illustrated in FIGS. 4 and 5. Note that the transistors M1 and M2 can have a different width-to-length ratio than the transistors M3 and M4. Therefore, the transistors M3 and M4 provide a current that is proportionate to the current through the transistors M1 and M2. The voltage VEAO is formed at the drain of the transistor M3.

The transistor M8, the transistor M9 and the transistor M10 serve to shift the level of the voltage VEAO at drain of the transistor M10 to a level appropriate for controlling the voltage at the second terminal of the resistor R31. When the voltage at the second terminal of the resistor R31 increases, the current through the transistor Q14 is decreased and, when, this voltage increases, the current through the transistor Q14 is decreased. Therefore, the current in the transistor Q14 is controlled by controlling the voltage at the second terminal of the resistor R31. The transistors Q14 and Q15 form a current mirror. The current through the transistor Q14 is mirrored by the current through the transistor Q15. The current through the transistor Q15 is integrated by charging the capacitor C21. The resistor R31 and the transistor Q14 serve as the inverter U1 illustrated in FIG. 4. The transistor Q15 and capacitor C20 serve as the integrator U3 illustrated in the FIG. 4. The voltage formed at the first terminal of the capacitor VA differs from the signal VRAMP illustrated in FIG. 4 in that the signal VRAMP is reset each cycle of the clock signal CLOCK. The transistors Q13, M5, M6 and M7 serve as biasing circuit for the circuit illustrated in FIG. 6.

The PFC stage of the circuit illustrated in FIG. 3 waits a period of time after start up for the output voltage, VOUT, to rise sufficiently before beginning the pulse-width modulation function. Without such a soft-start function, the pulse-width modulation stage will attempt to apply a maximum duty cycle to the transistor Q3 while the output voltage, VOUT, is at a low level which can result in excessive currents in the circuit. Therefore, the circuit illustrated in FIG. 3 includes the current source U17 for charging the capacitor C20. The pulse-width modulation function is inhibited by the comparator U12 until the voltage across the capacitor C20 rises above approximately 1.2 volts or until the voltage VDC rises above approximately 1.2 volts. Because the capacitor C20 is formed as part of the integrated circuit controller 200, the capacitor C20 has a low capacitance. To achieve a time delay that is sufficiently long (e.g. 1.0 millisecond) for the output voltage, Vout, to rise sufficiently, the current source U17 must supply a very small current (e.g. 5 uA). It is difficult, however, to reliably control the time delay due to the small current sourced by U17. For example, small disturbances caused by noise in the supply of power to the current source U17 can overwhelm the small current supplied by the current source U17 and, thus, can significantly affect the time for charging the capacitor C20.

The circuit illustrated in FIG. 4, therefore, also differs from the circuit illustrated in FIG. 3 in that the current source U17 illustrated in FIG. 3 is replaced in FIG. 4 with a switched current source U23. The switched current source U23 is coupled to receive the clock signal, CLOCK, from the oscillator U10 such that the switched current source U23 only provides current to charge the capacitor C20 during periodic intervals depending upon the level of the clock signal. Because the current source U23 only provides current to charge the capacitor C20 during a portion of the time, the current source U23 can source a larger current than the current source U17 while achieving a similar start-up time delay of approximately 1.0 millisecond. Because the current provided by the current source U23 is larger than the current provided by the current source U17, the start-up delay time is less affected by small disturbances. Therefore, the consistency of the start-up delay time is improved.

Figure 7:
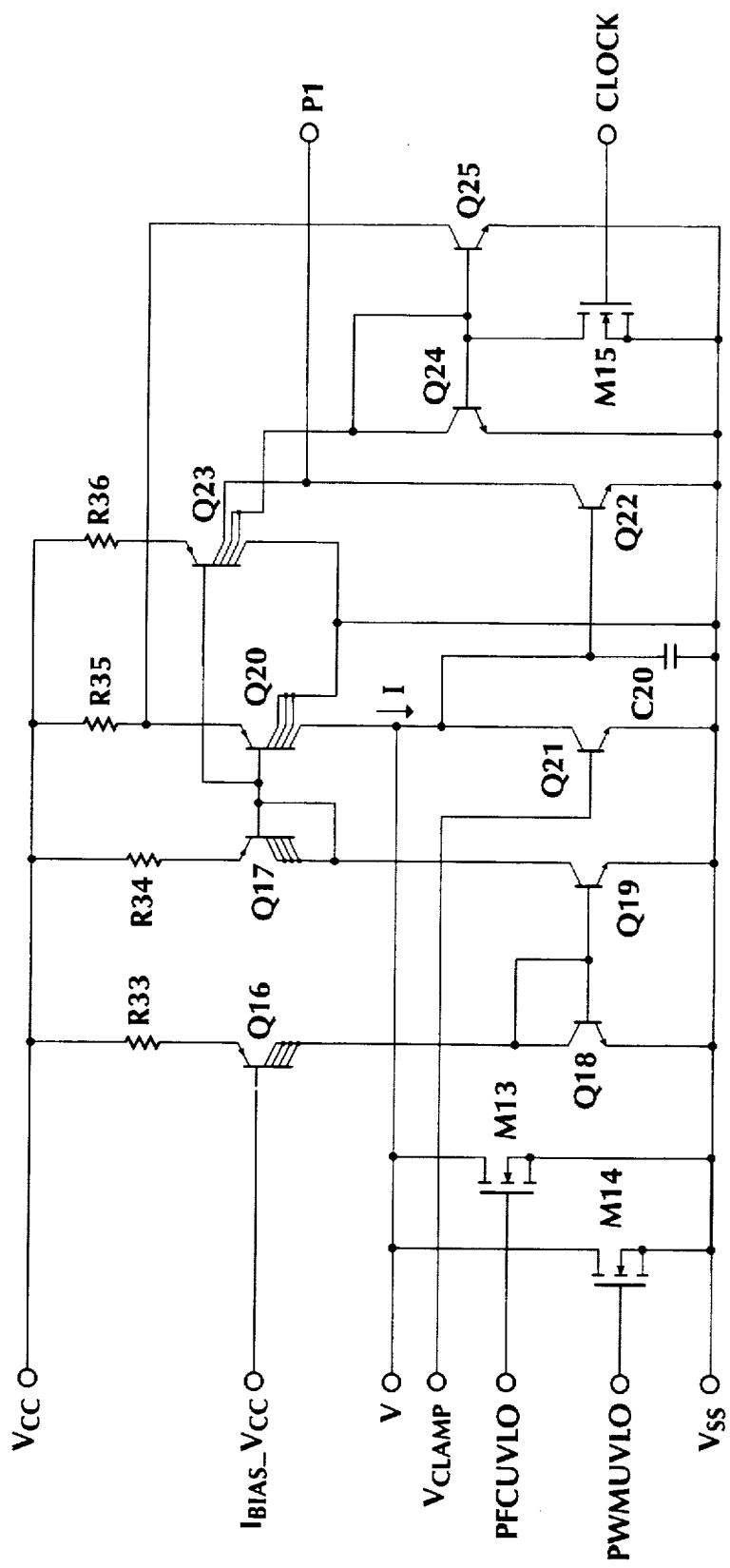
FIG. 7 illustrates a detailed schematic diagram of the switched current source for controlling the soft-start function of the PWM stage of the PFC-PWM converter illustrated in FIG. 4.

FIG. 7 illustrates a detailed schematic diagram of the switched current source U23 for controlling the soft-start function of the PWM stage of the PFC-PWM converter illustrated in FIG. 4. The supply voltage VCC is coupled to a first terminal of a resistor R33, to a first terminal of a resistor R34, to a first terminal of a resistor R35 and to a first terminal of a resistor R36. A second terminal of the resistor R33 is coupled to an emitter of a pnp bipolar transistor Q16. A base of the transistor Q16 is coupled to a node IBIAS. A collector of the transistor Q16 is coupled to a collector of an npn bipolar transistor Q18, to a base of the transistor Q18 and to a base of an npn bipolar transistor Q19. An emitter of the transistor Q18 and an emitter of the transistor Q19 are coupled to the supply node VSS.

A collector of the transistor Q19 is coupled to a collector of the transistor Q17, to a base of the transistor Q17, to a base of a pnp bipolar transistor Q20 and to a base of a pnp bipolar transistor Q23. An emitter of the transistor Q17 is coupled to a second terminal of the resistor R34. An emitter of the transistor Q20 is coupled to a second terminal of the resistor R34 and to a collector of an npn bipolar transistor Q25. A second terminal of the resistor R36 is coupled to an emitter of the transistor Q23. A first collector of the transistor Q23 is coupled to a first, a second and a third collector of the transistor Q20 and to VSS. A second and a third collector of the transistor Q23 are coupled to a collector of an npn bipolar transistor Q24, to a base of the transistor Q24, to a base of the transistor Q25 and to a drain of an NMOS transistor M15. A gate of the transistor M15 is coupled to receive the signal CLOCK. An emitter of the transistor Q24, a source of the transistor M15 and an emitter of the transistor Q25 are coupled to VSS.

A fourth collector of the transistor Q23 is coupled to a node P1 and to an emitter of a pnp bipolar transistor Q22. A collector of the transistor Q22 is coupled to VSS. A base of the transistor Q22 is coupled to a fourth emitter of the transistor Q20, to a first terminal of the capacitor C20, to an emitter of a pnp bipolar transistor Q21, to a drain of an NMOS transistor M13, to a node V and to a drain of an NMOS transistor M14. A second terminal of the capacitor C20, a collector of the transistor Q21, a source of the transistor M13 and a source of the transistor M14 are coupled to VSS. A base of the transistor Q21 is coupled to a node VCLAMP. A gate of the transistor M13 is coupled to a node PFCUVLO. A gate of the transistor M14 is coupled to a node PWMUVLO.

In FIG. 7, the transistor Q16 biases the transistor Q18 with a current. The current in the transistor Q18 is mirrored by the transistor Q19 such that a proportionate current flows in the transistor Q19. The current in the transistor Q19 biases the transistor Q17. The current in the transistor Q17 is mirrored by the transistor Q20 such that a proportionate current, I, flows from the transistor Q20 to charge the capacitor C20. The signal, CLOCK, is applied to the gate of the transistor M15. The transistor Q23 biases the transistor Q24 with a current. This current is mirrored by the transistor Q25. The current through the transistor Q25 also flows through the resistor R35. The voltage across the resistor R35 controls the current I.

When the clock signal CLOCK is logical low voltage, the transistor M15 disables the current mirror comprising the transistors Q24 and Q25, disabling the current I. When the clock signal CLOCK is a logical high voltage, the current, I, is enabled. Therefore, the capacitor C20 is charged at periodic intervals of time. Note that the capacitor C20 is also illustrated in FIG. 4 for controlling the soft-start function. After the pulse-width modulation function is enabled by the voltage across the capacitor C20 rising sufficiently, the capacitor C20 is discharged for the next start-up cycle.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. In addition, it will be apparent that a transistor of one type, such as NMOS, PMOS, bipolar pnp or bipolar npn can be interchanged with a transistor of another type, and in some cases interchanged with a diode, with appropriate modifications of the remaining circuitry, and so forth.

What is claimed is:

1. A converter controller for controlling a converter, the converter having a power factor correction stage, the power factor correction stage having a control loop for forming a regulated output voltage at an output node wherein the control loop comprises an error amplifier, the error amplifier comprising:

a. a first resistor having a first terminal and a second terminal wherein the first terminal of the first resistor is coupled to the output node of the power factor correction stage and the second terminal of the first resistor forms an output node of the error amplifier; and b. means for drawing a constant current from the output node of the error amplifier.

2. The converter controller according to claim 1 wherein the power factor correction stage comprises a switch coupled to a control a current in an inductor for charging a capacitor to the regulated output voltage and wherein the control loop further comprises:

a. means for forming a voltage representative of current in the inductor;

b. means for integrating a voltage generated at an output node of the error amplifier for forming an integrated voltage; and

15 c. means for comparing the integrated voltage to the voltage representative of the current in the inductor, the means for comparing coupled to control the switch.

3. The converter controller according to claim 1 wherein the means for drawing a constant current comprises a current mirror.

4. The converter controller according to claim 1 wherein the means for drawing a constant current comprises:
   a. a current source for generating a constant current;
   b. a first transistor having a base, a collector and an emitter wherein the collector of the first transistor is coupled to the base of the first transistor and to the current source; and
   c. a second transistor having a base, a collector and an emitter wherein the base of the second transistor is coupled to the base of the first transistor and to the collector of the second transistor and the emitter of the second transistor is coupled to the emitter of the first transistor and wherein the collector of the second transistor is coupled to the second terminal of the first resistor.

5. The converter controller according to claim 1 wherein the means for drawing a constant current comprises:
   a. a current source for generating a constant current;
   b. a first transistor having a gate, a drain and a source wherein the drain of the first transistor is coupled to the gate of the first transistor and to the current source; and
   c. a second transistor having a gate, a drain and a source wherein the gate of the second transistor is coupled to the gate of the first transistor and to the drain of the second transistor and the source of the second transistor is coupled to the source of the first transistor and wherein the drain of the second transistor is coupled to the second terminal of the first resistor.

6. The converter controller according to claim 1 wherein the converter further comprises a circuit for forming a supply voltage for the converter controller wherein the circuit for forming the supply voltage is coupled to the power factor correction stage and wherein the converter controller comprises an overvoltage protection circuit coupled to monitor the supply voltage wherein the overvoltage protection circuit and the voltage control loop each prevent the regulated output voltage from becoming excessive.

7. The converter controller according to claim 1 wherein the converter further comprises a pulse-width modulation stage coupled to the output node of the power factor correction stage for receiving the regulated output voltage.

8. The converter controller according to claim 7 wherein the pulse-width modulation stage comprises means for preventing a voltage regulating function of the pulse-width modulation stage from beginning until a after predetermined amount of time has elapsed from start-up of the converter.

9. The converter controller according to claim 8 wherein the converter controller is an integrated circuit having no more than eight pins.

10. The converter controller according to claim 8 wherein the means for preventing comprises a current source for charging a capacitor to a predetermined voltage wherein the current source only charges the capacitor during periodic intervals.

11. The converter controller according to claim 1 further comprising a compensation element coupled to the output of the error amplifier.

12. The converter controller according to claim 11 wherein the compensation element comprises a second resistor and a capacitor coupled in series.

16

13. A converter controller for controlling a converter, the converter comprising a power factor correction stage wherein the power factor correction stage comprises means for switching coupled to alternately charge a first inductor and to discharge the first inductor into an output capacitor for forming a regulated output voltage across the output capacitor and means for forming a supply voltage for providing power to the converter controller wherein the means for forming the supply voltage comprises a second inductor inductively coupled to the first inductor, and wherein the converter controller comprises:
   a. means for controlling the means for switching in a feedback loop for maintaining the regulated output voltage at a desired level, the means for controlling coupled to the output capacitor and to the means for switching; and
   b. means for disabling coupled to the means for switching for disabling the means for switching when a level of voltage formed by the means for forming the supply voltage exceeds a predetermined level.

14. The converter controller according to claim 13 wherein the means for controlling the means for switching in a feedback loop comprises:
   a. a current source for generating a constant current;
   b. a first transistor having a base, a collector and an emitter wherein the collector of the first transistor is coupled to the base of the first transistor and to the current source;
   c. a second transistor having a base, a collector and an emitter wherein the base of the second transistor is coupled to the base of the first transistor and to the collector of the second transistor and the emitter of the second transistor is coupled to the emitter of the first transistor; and
   d. a resistor having a first terminal and a second terminal wherein the first terminal of the resistor is coupled to receive the regulated output voltage and the second terminal of the resistor is coupled to the collector of the second transistor.

15. The converter controller according to claim 13 wherein the means for controlling the means for switching comprises:
   a. a current source for generating a constant current;
   b. a first transistor having a gate, a drain and a source wherein the drain of the first transistor is coupled to the gate of the first transistor and to the current source; and
   c. a second transistor having a gate, a drain and a source wherein the gate of the second transistor is coupled to the gate of the first transistor and to the drain of the second transistor and the source of the second transistor is coupled to the source of the first transistor; and
   d. a resistor having a first terminal and a second terminal wherein the first terminal of the resistor is coupled to receive the regulated output voltage and the second terminal of the resistor is coupled to the drain of the second transistor.

16. A converter controller for controlling a converter, the converter having a pulse-width modulation stage, the pulse width modulation stage comprising:
   a. a capacitor;
   b. means for charging the capacitor with a first current during periodic intervals upon start-up of the converter;
   c. means for charging the capacitor with a second current during alternate intervals; and
   d. means for preventing the pulse-width modulation function from beginning until after a voltage across the capacitor has risen to a predetermined level.

17. The converter controller according to claim 16 wherein the second current is substantially zero.

18. The converter controller according to claim 16 further comprising a power factor correction stage wherein the power factor correction stage comprises:

a. means for switching coupled to alternately charge a first inductor and to discharge the first inductor into an output capacitor for forming a regulated output voltage across the output capacitor wherein the pulse-width modulation stage is coupled to the output capacitor for receiving the regulated output voltage;

b. means for controlling the means for switching in a feedback loop for maintaining the regulated output voltage at a desired level, the means for controlling coupled to the output capacitor and to the means for switching;

c. means for forming a supply voltage for providing power to the converter controller wherein the means for forming comprises a second inductor inductively coupled to the first inductor; and d. means for disabling coupled to the means for switching for disabling the means for switching when a level of voltage formed by the means for forming exceeds a predetermined level.

19. The converter controller according to claim 18 wherein the converter controller is an integrated circuit having no more than eight pins.

20. The converter controller according to claim 18 wherein the means for controlling the means for switching comprises:

a. a current source for generating a constant current;

b. a first transistor having a base, a collector and an emitter wherein the collector of the first transistor is coupled to the base of the first transistor and to the current source;

c. a second transistor having a base, a collector and an emitter wherein the base of the second transistor is coupled to the base of the first transistor and to the collector of the second transistor and the emitter of the second transistor is coupled to the emitter of the first transistor; and d. a resistor having a first terminal and a second terminal wherein the first terminal of the resistor is coupled to receive the regulated output voltage and the second terminal of the resistor is coupled to the collector of the second transistor.

21. The converter controller according to claim 18 wherein the means for controlling the means for switching means comprises:

a. a current source for generating a constant current;

b. a first transistor having a gate, a drain and a source wherein the drain of the first transistor is coupled to the gate of the first transistor and to the current source; and c. a second transistor having a gate, a drain and a source wherein the gate of the second transistor is coupled to the gate of the first transistor and to the drain of the second transistor and the source of the second transistor is coupled to the source of the first transistor;

d. a resistor having a first terminal and a second terminal wherein the first terminal of the resistor is coupled to receive the regulated output voltage and the second terminal of the resistor is coupled to the drain of the second transistor.

22. An error amplifier having an input node and output node, wherein a change in an input voltage level applied to the input node results in a change in an output voltage formed at the output node wherein the change in the output voltage relative to an expected quiescent value for the output voltage is greater than the change in the input voltage relative to an expect quiescent value for the input voltage, the error amplifier comprising:

a. a first resistor having a first terminal and a second terminal wherein the first terminal of the first resistor forms the input node for the error amplifier and the second terminal of the first resistor forms the output node for the error amplifier; and b. means for drawing a constant current through the resistor.

23. The error amplifier according to claim 22 wherein the means for drawing a constant current comprises a current mirror.

24. The error amplifier according to claim 22 wherein the means for drawing a constant current comprises:

a. a current source for generating a constant current;

b. a first transistor having a base, a collector and an emitter wherein the collector of the first transistor is coupled to the base of the first transistor and to the current source; and c. a second transistor having a base, a collector and an emitter wherein the base of the second transistor is coupled to the base of the first transistor and to the collector of the second transistor and the emitter of the second transistor is coupled to the emitter of the first transistor and wherein the collector of the second transistor is coupled to the second terminal of the first resistor.

25. The amplifier according to claim 22 wherein the means for drawing a constant current comprises:

a. a current source for generating a constant current;

b. a first transistor having a gate, a drain and a source wherein the drain of the first transistor is coupled to the gate of the first transistor and to the current source; and c. a second transistor having a gate, a drain and a source wherein the gate of the second transistor is coupled to the gate of the first transistor and to the drain of the second transistor and the source of the second transistor is coupled to the source of the first transistor and wherein the drain of the second transistor is coupled to the second terminal of the first resistor.

26. The amplifier according to claim 22 further comprising a compensation element coupled to the output of the error amplifier.

27. The amplifier according to claim 26 wherein the compensation element comprises a second resistor and a capacitor coupled in series.

* * * * *